(12) United States Patent
Inukai

(10) Patent No.: US 10,838,166 B2
(45) Date of Patent: Nov. 17, 2020

(54) REAR ATTACHMENT LENS AND IMAGING APPARATUS

(71) Applicant: FUJIFILM Corporation, Tokyo (JP)

(72) Inventor: Hajime Inukai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 236 days.

(21) Appl. No.: 15/982,962

(22) Filed: May 17, 2018

(65) Prior Publication Data

US 2018/0348477 A1 Dec. 6, 2018

(30) Foreign Application Priority Data

May 31, 2017 (JP) ................. 2017-108680

(51) Int. Cl.
| | | |
|---|---|---|
| *G02B 15/10* | (2006.01) | |
| *G02B 15/14* | (2006.01) | |
| *G02B 27/00* | (2006.01) | |
| *G02B 7/02* | (2006.01) | |
| *G02B 9/12* | (2006.01) | |
| *G02B 15/12* | (2006.01) | |

(52) U.S. Cl.
CPC .............. *G02B 9/12* (2013.01); *G02B 7/021* (2013.01); *G02B 15/10* (2013.01); *G02B 15/12* (2013.01); *G02B 27/0037* (2013.01); *G02B 15/14* (2013.01)

(58) Field of Classification Search
CPC ........ G02B 15/10; G02B 15/12; G02B 15/14; G02B 15/04; G02B 15/08
See application file for complete search history.

(56) References Cited

U.S. PATENT DOCUMENTS

| | | | | |
|---|---|---|---|---|
| 4,588,265 | A | | 5/1986 | Takahashi |
| 4,634,235 | A | * | 1/1987 | Fujioka .................. G02B 15/10 359/675 |
| 4,643,536 | A | * | 2/1987 | Yamada ................. G02B 15/02 359/675 |
| 4,830,474 | A | * | 5/1989 | Nakayama ............. G02B 15/10 359/675 |

(Continued)

FOREIGN PATENT DOCUMENTS

| | | |
|---|---|---|
| JP | S52-018139 Y1 | 4/1977 |
| JP | S58-102207 A | 6/1983 |

(Continued)

OTHER PUBLICATIONS

An Office Action; "Notice of Reasons for Refusal," mailed by the Japanese Patent Office dated Jun. 9, 2020, which corresponds to Japanese Patent Application No. 2017-108680 and is related to U.S. Appl. No. 15/982,962; with English language translation.

*Primary Examiner* — William R Alexander
*Assistant Examiner* — Ephrem Z Mebrahtu
(74) *Attorney, Agent, or Firm* — Studebaker & Brackett PC

(57) ABSTRACT

The rear attachment lens has a positive refractive power as a whole, and is attached to an image side of a main lens so as to change a focal length of the whole lens system after attachment to a focal length longer than a focal length of the main lens. The rear attachment lens includes a most object side lens that is a lens which has a negative refractive power and is disposed to be closest to an object side, and a most image side lens that is a lens which has a positive refractive power and is disposed to be closest to the image side.

20 Claims, 10 Drawing Sheets

EXAMPLE 1

(56) References Cited

U.S. PATENT DOCUMENTS

| | | | | |
|---|---|---|---|---|
| 5,253,112 | A * | 10/1993 | Suzuki | G02B 15/08 |
| | | | | 359/675 |
| 5,349,474 | A * | 9/1994 | Shimizu | G02B 15/08 |
| | | | | 359/675 |
| 6,288,847 | B1 | 9/2001 | Tsutsumi | |
| 2011/0080647 | A1 * | 4/2011 | Sugita | G02B 27/0062 |
| | | | | 359/675 |
| 2011/0141573 | A1 * | 6/2011 | Eguchi | G02B 15/10 |
| | | | | 359/675 |
| 2013/0064532 | A1 * | 3/2013 | Caldwell | G02B 13/18 |
| | | | | 396/71 |
| 2015/0355437 | A1 | 12/2015 | Kikuchi | |

FOREIGN PATENT DOCUMENTS

| | | |
|---|---|---|
| JP | S62-160413 A | 7/1987 |
| JP | H11-249015 A | 9/1999 |
| JP | 2011-081111 A | 4/2011 |
| JP | 2014-170043 A | 9/2014 |
| JP | 2018-060093 A | 4/2018 |
| KR | 10-2014-0010840 A | 1/2014 |

\* cited by examiner

REAR ATTACHMENT LENS AND IMAGING APPARATUS

CROSS-REFERENCE TO RELATED APPLICATIONS

The present application claims priority under 35 U.S.C. § 119 to Japanese Patent Application No. 2017-108680, filed on May 31, 2017. The above application is hereby expressly incorporated by reference, in its entirety, into the present application.

BACKGROUND OF THE INVENTION

1. Field of the Invention

The present invention relates to a rear attachment lens that is attached to an image side of a main lens as an imaging lens so as to change a focal length of the whole lens system after attachment to a focal length longer than a focal length of the imaging lens before attachment, and an imaging apparatus.

2. Description of the Related Art

In the related art, in the field of broadcast cameras or the like, various types of attachment lenses or converter lenses, each of which is detachably attached between a main lens for imaging and an image plane so as to change a focal length of the whole lens system after attachment to a focal length longer than a focal length of the main lens, have been proposed (refer to, for example, JP2011-081111A, JP1999-249015A (JP-H11-249015A), and JP1987-160413A (JP-S62-160413A)).

SUMMARY OF THE INVENTION

In television cameras, video cameras, and the like which require relatively high resolving power, a color separation optical system and various optical filters are inserted between an imaging lens system and an imaging element capturing an image formed by an imaging lens system. Therefore, a long back focal length is required even in an imaging lens system in a state in which a rear attachment lens is attached to the main lens.

In addition, since the main lens alone may be used for imaging without attachment of the rear attachment lens, aberrations are satisfactorily corrected in advance through the main lens alone. Therefore, in order to maintain the combined optical performance favorably after attaching the rear attachment lens to the main lens, it is necessary to correct aberrations satisfactorily through the rear attachment lens alone.

However, the lens system described in JP2011-081111A is not able to sufficiently ensure a back focal length. The lens system described in JP1999-249015A (JP-H11-249015A) has room for improvement in correction of longitudinal chromatic aberration. In the lens system described in JP1987-160413A (JP-S62-160413A), the back focal length can not be sufficiently ensured, and spherical aberration, longitudinal chromatic aberration, and astigmatism are insufficiently corrected.

The present invention has an object to provide a rear attachment lens which has an effect of increasing the focal length of the whole lens system by being attached to the main lens, of which the back focal length is sufficiently ensured, in which various aberrations such as chromatic aberration are satisfactorily corrected, and which has high optical performance, and an imaging apparatus.

A first rear attachment lens of the present invention is attached to an image side of a main lens as an imaging lens so as to change a focal length of the whole lens system after attachment to a focal length longer than a focal length of the main lens. The rear attachment lens comprises: a most object side lens that is a lens which has a negative refractive power and is disposed to be closest to an object side; and a most image side lens that is a lens which has a positive refractive power and is disposed to be closest to the image side. The rear attachment lens has a positive refractive power as a whole. In addition, assuming that a partial dispersion ratio of the most object side lens between a g line and an F line is $\theta gL11$ and an Abbe number of the most object side lens at a d line is $\nu L11$, Conditional Expression (1) is satisfied.

$$0.62 < \theta gL11 + 0.001625 \times \nu L11 < 0.65 \quad (1)$$

In the first rear attachment lens of the present invention, it is preferable that Conditional Expression (1-1) is satisfied.

$$0.63 < \theta gL11 + 0.001625 \times \nu L11 < 0.64 \quad (1-1)$$

A second rear attachment lens of the present invention is attached to an image side of a main lens as an imaging lens so as to change a focal length of the whole lens system after attachment to a focal length longer than a focal length of the main lens. The rear attachment lens consists of, in order from the object side: a first lens group that has a negative refractive power; a second lens group that has a positive refractive power; and a third lens group that has a positive refractive power. The first lens group consists of, in order from the object side, a most object side lens that is a lens which has a negative refractive power and is disposed to be closest to an object side, and a cemented lens that is formed by cementing at least one negative lens and at least one positive lens. The second lens group consists of, in order from the object side, a positive lens and a negative lens. In addition, the third lens group consists of, in order from the object side, a negative lens, a positive lens, a negative lens, and a positive lens.

In the second rear attachment lens of the present invention, assuming that a focal length of the first lens group is fG1 and a focal length of the most object side lens is fL11, it is preferable that Conditional Expression (2) is satisfied, and it is more preferable that Conditional Expression (2-1) is satisfied.

$$0.5 < fG1/fL11 < 1.5 \quad (2)$$

$$0.6 < fG1/fL11 < 1.2 \quad (2-1)$$

In the second rear attachment lens of the present invention, it is preferable that a lens closest to the object side in the third lens group and a second lens from the object side in the third lens group are cemented to each other. Assuming that a partial dispersion ratio of the lens closest to the object side in the third lens group between the g line and the F line is $\theta gL31$, a partial dispersion ratio of the second lens from the object side in the third lens group between the g line and the F line is $\theta gL32$, a refractive index of the lens closest to the object side in the third lens group at the d line is NL31, and a refractive index of the second lens from the object side in the third lens group at the d line is NL32, it is preferable that Conditional Expressions (3) and (4) are satisfied, and it is more preferable that at least one of Conditional Expression (3-1) or (4-1) is satisfied.

$$-0.02 < \theta gL31 - \theta gL32 < 0.02 \quad (3)$$

$$0.3 < NL31 - NL32 < 0.5 \quad (4)$$

$$-0.01 < \theta gL31 - \theta gL32 < 0.01 \quad (3\text{-}1)$$

$$0.35 < NL31 - NL32 < 0.45 \quad (4\text{-}1)$$

Hereinafter, both the first and second rear attachment lenses of the present invention are assumed as rear attachment lenses of the present invention. In the rear attachment lens of the present invention, assuming that a refractive index the most object side lens at the d line is NL11, and an Abbe number of the most object side lens at the d line is vL11, it is preferable that Conditional Expressions (5) and (6) are satisfied, and it is more preferable that at least of Conditional Expression (5-1) or (6-1) is satisfied.

$$1.53 < NL11 < 1.8 \quad (5)$$

$$45 < vL11 < 75 \quad (6)$$

$$1.55 < NL11 < 1.76 \quad (5\text{-}1)$$

$$50 < vL11 < 70 \quad (6\text{-}1)$$

In the rear attachment lens of the present invention, assuming that a focal length of the most object side lens is fL11 and a focal length of the rear attachment lens is fRA, it is preferable that Conditional Expression (7) is satisfied, and it is more preferable that Conditional Expression (7-1) is satisfied.

$$-0.5 < fL11/fRA < -0.05 \quad (7)$$

$$-0.4 < fL11/fRA < -0.1 \quad (7\text{-}1)$$

The rear attachment lens of the present invention further comprises, in order from the object side: a three cemented lens that are formed by cementing three lenses consisting of a negative lens, a positive lens, and a negative lens. Assuming that a partial dispersion ratio of the positive lens in the three cemented lens between the g line and the F line is θgTL2, a partial dispersion ratio of the negative lens closest to the image side in the three cemented lens between the g line and the F line is θgTL3, a refractive index of the positive lens in the three cemented lens at the d line is NTL2, a refractive index of the negative lens closest to the image side in the three cemented lens at the d line is NTL3, and an Abbe number of the positive lens in the three cemented lens at the d line is vTL2, it is preferable that Conditional Expressions (8), (9), and (10) are satisfied, and it is more preferable that at least of Conditional Expression (9-1) or (10-1) is satisfied.

$$-0.03 < \theta gTL2 - \theta gTL3 < 0.03 \quad (8)$$

$$-0.35 < NTL2 - NTL3 < -0.15 \quad (9)$$

$$20 < vTL2 < 40 \quad (10)$$

$$-0.3 < NTL2 - NTL3 < -0.2 \quad (9\text{-}1)$$

$$28 < vTL2 < 37 \quad (10\text{-}1)$$

In the rear attachment lens of the present invention, assuming that a distance on an optical axis from a lens surface closest to the object side in the rear attachment lens to an object side principal point of the rear attachment lens is ef, and a distance on the optical axis from the lens surface closest to the object side in the rear attachment lens to a lens surface closest to the image side in the rear attachment lens is RAT, it is preferable that Conditional Expression (11) is satisfied, and it is more preferable that Conditional Expression (11-1) is satisfied.

$$1 < ef/\text{RAT} < 5 \quad (11)$$

$$1.5 < ef/\text{RAT} < 4 \quad (11\text{-}1)$$

An imaging apparatus of the present invention comprises the main lens; and the rear attachment lens of the present invention.

In the present description, it should be noted that the terms "consisting of ~" and "consists of ~" mean that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" means that the group has a positive refractive power as a whole. It is the same for the term "~ group that has a negative refractive power". In the present specification, the sign of the refractive power of the group, the sign of the refractive power of the lens, and the surface shape of the lens will be considered in terms of the paraxial region unless otherwise specified. The focal length and the principal point used in the conditional expressions are values at the d line (a wavelength of 587.6 nm (nanometers)). The reference sign of ef is positive in a case where the object side principal point of the rear attachment lens is on the image side from the lens surface closest to the object side in the rear attachment lens, and is negative in a case where the object side principal point is on the object side.

It should be noted that the partial dispersion ratio θgF between the g line and the F line of a certain lens is defined by θgF=(Ng−NF)/(NF−NC), where the refractive indexes of the lens at the g line (a wavelength of 435.8 nm (nanometers)), F line (a wavelength of 486.1 nm (nanometers)), and C line (a wavelength of 656.3 nm (nanometers)) are Ng, NF, and NC, respectively.

According to the present invention, it is possible to provide a rear attachment lens which has an effect of increasing the focal length of the whole lens system by being attached to the main lens, of which the back focal length is sufficiently ensured, in which various aberrations such as chromatic aberration are satisfactorily corrected, and which has high optical performance, and an imaging apparatus comprising the rear attachment lens.

DESCRIPTION OF THE PREFERRED EMBODIMENTS

Figure 1:
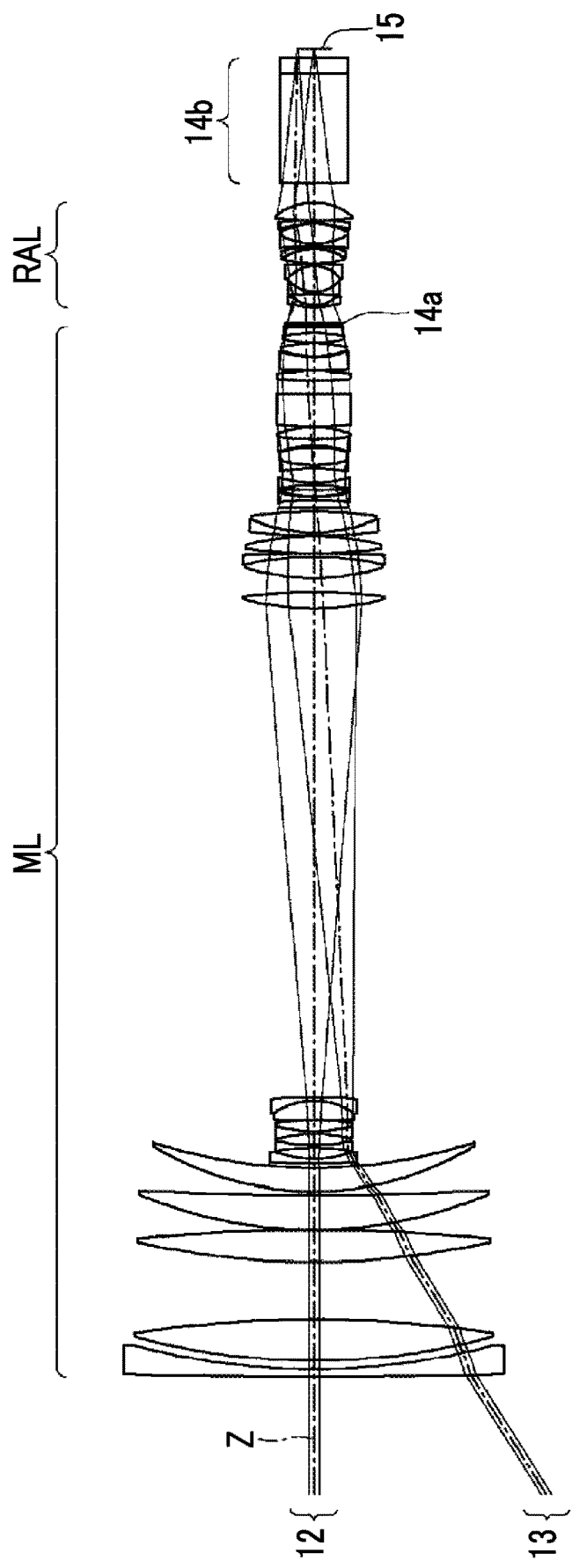
FIG. 1 is a cross-sectional view illustrating an optical path and a configuration in a state where a rear attachment lens and a main lens according to an embodiment of the present invention are attached.
Figure 2:
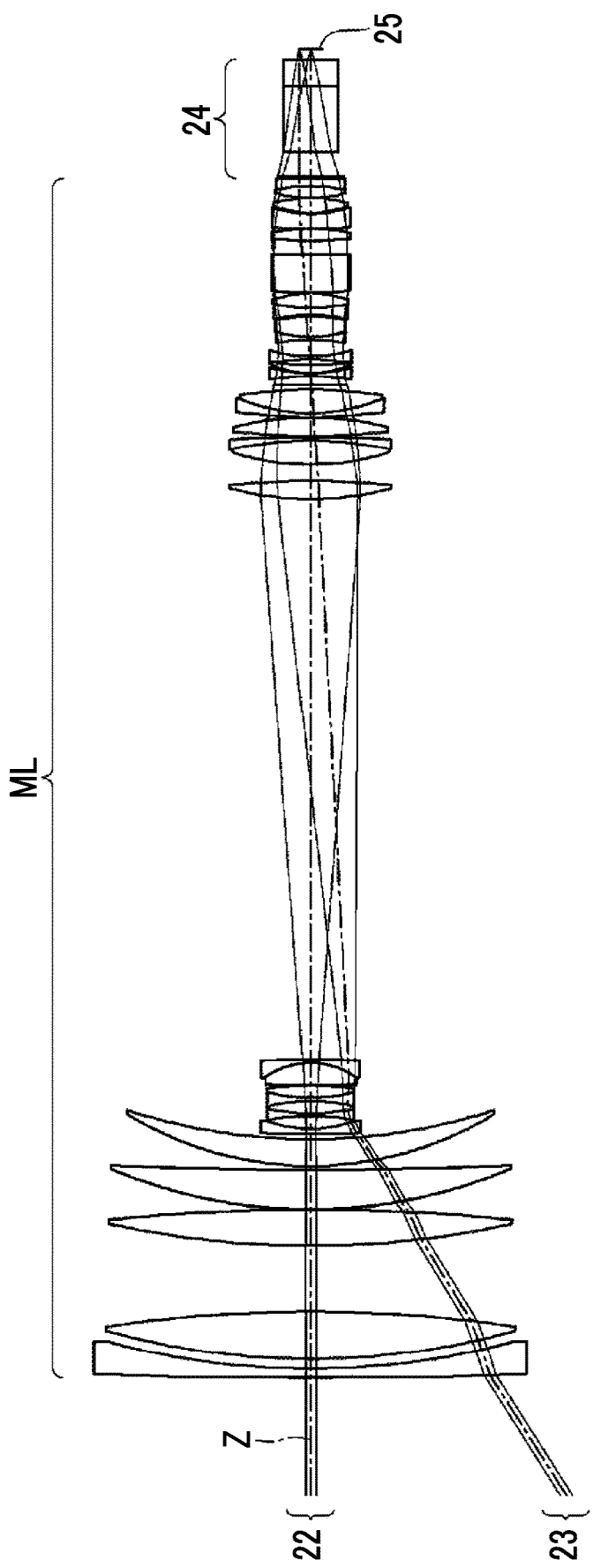
FIG. 2 is a cross-sectional view illustrating the optical path of the configuration of the main lens of FIG. 1.
Figure 3:
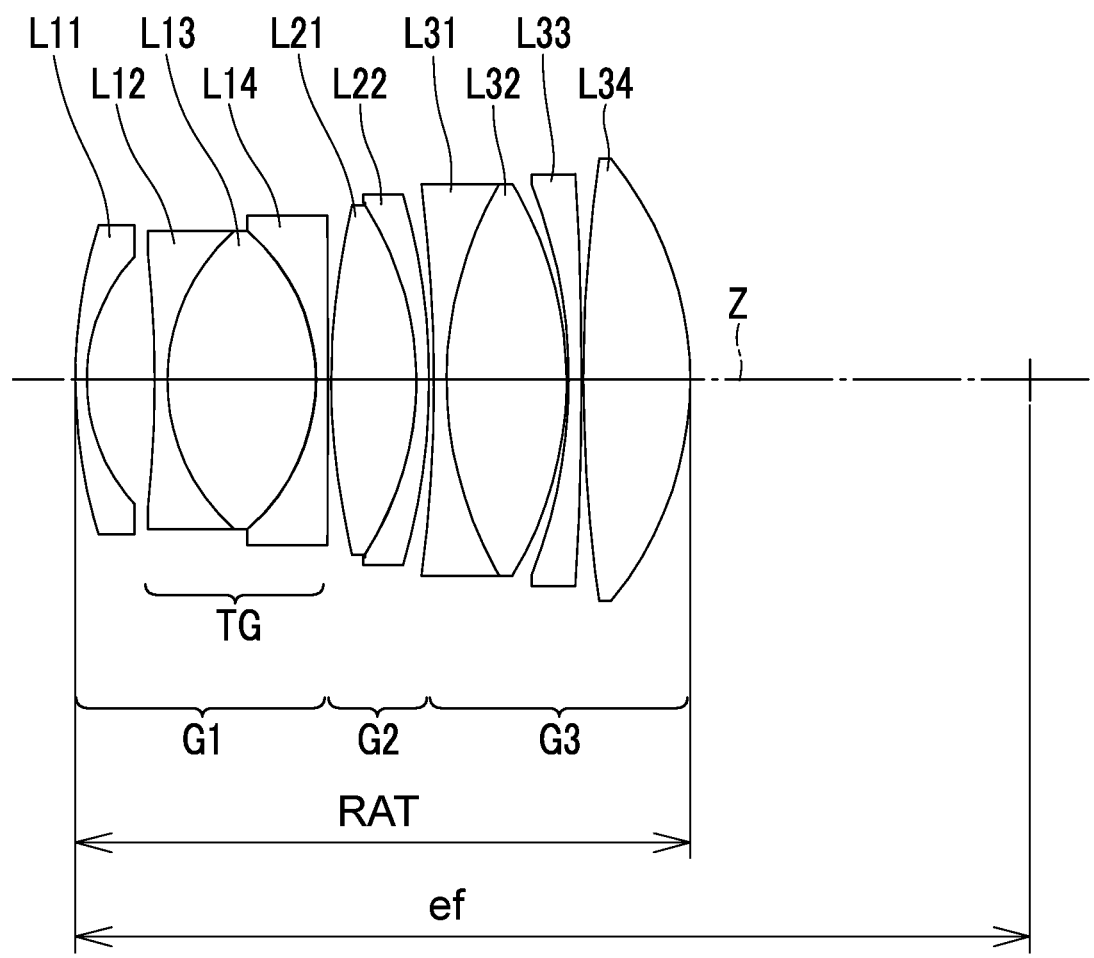
FIG. 3 is a cross-sectional view illustrating a configuration of a rear attachment lens of Example 1 of the present invention.

Hereinafter, embodiments of the present invention will be described with reference to drawings. FIG. 1 is a cross-sectional view illustrating a configuration in a state where a rear attachment lens RAL according to an embodiment of the present invention is attached to an image side of a main lens (referred to as a master lens) ML. FIG. 2 is a cross-sectional view illustrating a configuration in a state where the rear attachment lens RAL is not attached to the image side of the main lens ML of FIG. 1. FIG. 3 is a cross-sectional view illustrating a configuration of the rear attachment lens RAL of FIG. 1. The rear attachment lens RAL of an example shown in FIG. 3 corresponds to Example 1 to be described later. In FIGS. 1 to 3, the left side is the object side, and the right side is the image side. In FIG. 1, the on-axis rays 12 from the object at infinity, and the off-axis rays 13 with the maximum angle of view are also shown together. In FIG. 2, the on-axis rays 22 from the object at infinity and the off-axis rays 23 at the maximum angle of view are also shown together.

The rear attachment lens RAL is attached to the image side of the main lens ML so as to change the focal length of the whole lens system (the combined optical system of the main lens ML and the rear attachment lens RAL) after attachment to a focal length longer than the focal length of the main lens ML. The main lens ML is an imaging lens that can be attached to an imaging apparatus such as a broadcast camera, a video camera, a digital camera, or the like.

The rear attachment lens RAL may be attached to the image side of the main lens ML so as to have a function of making the image size of the whole lens system after attachment larger than the image size of the main lens ML. As can be seen from the fact that the size of the image plane 15 shown in FIG. 1 is larger than the size of the image plane 25 shown in FIG. 2, the rear attachment lens RAL of the present embodiment also has a function of enlarging the image size.

In a case where the imaging lens system is attached to the imaging apparatus, it is conceivable to provide optical members such as a cover glass for protecting an imaging element, a color separation prism corresponding to specification of the imaging apparatus, and various filters. The optical members 14a and 14b in FIG. 1 and the optical member 24 in FIG. 2 are supposed to be the above-mentioned optical members, and the incident surface and the exit surface are formed in parallel planes. However, in the present invention, the optical members 14a, 14b, and 24 are not indispensable constituent elements, and at least one of the optical members 14a, 14b, and 24 may be omitted.

The rear attachment lens RAL of the present embodiment can have a positive refractive power as a whole. In general, the rear attachment lens is often configured to have a negative refractive power as a whole. However, in a case of adopting a configuration having a negative refractive power as a whole, fluctuation in aberration tends to increase due to attachment to the main lens, and, for example, field curvature generated in the main lens tends to be further deteriorated. On the other hand, in a case where the rear attachment lens RAL itself has a positive refractive power as a whole, curvature of field can be minimized effectively.

The rear attachment lens RAL of the present embodiment includes a most object side lens L11 that has a negative refractive power and is disposed closest to the object side. Since a negative lens is disposed to be closest to the object side in the rear attachment lens RAL, a negative refractive power can be assigned to a position closest to the main lens ML. As a result, it is possible to effectively achieve the long focal length and ensure the desired back focal length.

Further, the rear attachment lens RAL of the present embodiment includes the most image side lens L34 that has a positive refractive power and is disposed to be closest to the image side. Since a positive lens is disposed to be closest to the image side in the rear attachment lens RAL, it is possible to minimize the incident angle of the off-axis principal ray onto the image plane 15.

In a case where the rear attachment lens RAL as a whole has a positive refractive power, it tends to be difficult to ensure the back focal length. However, by adopting a configuration including the most object side lens L11 and the most image side lens L34 as in the present embodiment, it becomes easy to position the object side principal point as close as possible to the image side. Even in a case where the rear attachment lens RAL has a positive refractive power as a whole, it becomes easy to change the focal length of the whole lens system after attachment to a focal length longer than the focal length of the main lens. As a result, it is possible to ensure a back focal length.

The most object side lens L11 is preferably formed into a meniscus shape convex toward the object side. In such a case, it is possible to suppress occurrence of spherical aberration and astigmatism.

Assuming that a partial dispersion ratio of the most object side lens L11 between the g line and the F line is $\theta gL11$ and an Abbe number of the most object side lens L11 at a d line is $vL11$, it is preferable that Conditional Expression (1) is satisfied. By selecting a material so as to not allow the result of Conditional Expression (1) to be equal to or less than the lower limit, it is possible to prevent the secondary spectrum from becoming insufficiently corrected. By selecting a material so as to not allow the result of Conditional Expression (1) to be equal to or greater than the upper limit, it is possible to prevent the secondary spectrum from being excessively corrected. By selecting a material so as to satisfy Conditional Expression (1), it is possible to satisfactorily correct the secondary spectrum. In addition, in a case of a configuration in which Conditional Expression (1-1) is satisfied, it is possible to obtain more favorable characteristics.

$$0.62 < \theta gL11 + 0.001625 \times vL11 < 0.65 \quad (1)$$

$$0.63 < \theta gL11 + 0.001625 \times vL11 < 0.64 \quad (1-1)$$

Assuming that a refractive index the most object side lens L11 at the d line is NL11, it is preferable that Conditional Expression (5) is satisfied. By not allowing the result of Conditional Expression (5) to be equal to or less than the lower limit, occurrence of spherical aberration can be suppressed and a strong negative refractive power can be given to the most object side lens L11. As a result, it is possible to effectively achieve a long focal length and ensure a desired back focal length. By not allowing the result of Conditional Expression (5) to be equal to or greater than the upper limit, it is possible to select a material having an appropriate Abbe number, and it becomes easy to correct chromatic aberration. In addition, in a case of a configuration in which Conditional Expression (5-1) is satisfied instead of Conditional Expression (5), it is possible to obtain more favorable characteristics. In a case of a configuration in which Conditional Expression (5-2) is satisfied, it is possible to obtain further more favorable characteristics.

$$1.53 < NL11 < 1.8 \tag{5}$$

$$1.55 < NL11 < 1.76 \tag{5-1}$$

$$1.6 < NL11 < 1.76 \tag{5-2}$$

Assuming that an Abbe number of the most object side lens L11 at the d line is vL11, it is preferable that Conditional Expression (6) is satisfied. The most object side lens L11 changes the incident on-axis rays from the convergent light to divergent light, and emits the light. By not allowing the result of Conditional Expression (6) to be equal to or less than the lower limit, it is possible to use a low dispersion material for the most object side lens L11, and to suppress occurrence of longitudinal chromatic aberration. By not allowing the result of Conditional Expression (6) to be equal to or greater than the upper limit, it is possible to select a material having an appropriate refractive index. In a case of a configuration in which Conditional Expression (6-1) is satisfied instead of Conditional Expression (6), it is possible to obtain more favorable characteristics. In a case of a configuration in which Conditional Expression (6-2) is satisfied, it is possible to obtain further more favorable characteristics.

$$45 < vL11 < 75 \tag{6}$$

$$50 < vL11 < 70 \tag{6-1}$$

$$52 < vL11 < 67 \tag{6-2}$$

In addition, in a case where Conditional Expression (5) and (6) is satisfied, it is easy to select an appropriate material, and there is an advantage in obtaining more favorable characteristics.

Assuming that a focal length of the most object side lens L11 is fL11 and a focal length of the rear attachment lens RAL is fRA, it is preferable that Conditional Expression (7) is satisfied. By not allowing the result of Conditional Expression (7) to be equal to or less than the lower limit, it is possible to ensure a desired back focal length. By not allowing the result of Conditional Expression (7) to be equal to or greater than the upper limit, it becomes easy to correct various aberrations. In addition, in a case of a configuration in which Conditional Expression (7-1) is satisfied, it is possible to obtain more favorable characteristics.

$$-0.5 < fL11/fRA < -0.05 \tag{7}$$

$$-0.4 < fL11/fRA < -0.1 \tag{7-1}$$

Assuming that a partial dispersion ratio of the most object side lens L11 between the g line and the F line is θgL11, it is preferable that Conditional Expression (12) is satisfied. By selecting a material so as to not allow the result of Conditional Expression (12) to be equal to or less than the lower limit, it is possible to prevent the secondary spectrum from becoming insufficiently corrected. By selecting a material so as to not allow the result of Conditional Expression (12) to be equal to or greater than the upper limit, it is possible to prevent the secondary spectrum from being excessively corrected. By selecting a material so as to satisfy Conditional Expression (12), it is possible to satisfactorily correct the secondary spectrum. In addition, in a case of a configuration in which Conditional Expression (12-1) is satisfied, it is possible to obtain more favorable characteristics.

$$0.53 < \theta gL11 < 0.56 \tag{12}$$

$$0.54 < \theta gL11 < 0.55 \tag{12-1}$$

It is preferable that the most image side lens L34 has a shape convex toward the image side. In this case, it is possible to easily correct spherical aberration generated by the negative lens.

Assuming that a refractive index of the most image side lens L34 at the d line is NL34, it is preferable that Conditional Expression (18) is satisfied. By not allowing the result of Conditional Expression (18) to be equal to or less than the lower limit, it is possible to make the radius of curvature of the most image side lens L34 appropriate. Thus, it is possible to suppress occurrence of spherical aberration. By not allowing the result of Conditional Expression (18) to be equal to or greater than the upper limit, it becomes easy to suppress various aberrations that are caused since a negative refractive power in the rear attachment lens RAL necessary for the effect of the long focal length becomes stronger while obtaining the effect of the long focal length. Further, it is possible to suppress occurrence of spherical aberration. In addition, in a case of a configuration in which Conditional Expression (18-1) is satisfied instead of Conditional Expression (18), it is possible to obtain more favorable characteristics.

$$1.45 < NL34 < 1.75 \tag{18}$$

$$1.45 < NL34 < 1.65 \tag{18-1}$$

Assuming that an Abbe number of the most image side lens L34 at the d line is vL34, it is preferable that Conditional Expression (19) is satisfied. By not allowing the result of Conditional Expression (19) to be equal to or less than the lower limit, it is possible to suppress longitudinal chromatic aberration, and lateral chromatic aberration. By not allowing the result of Conditional Expression (19) to be equal to or greater than the upper limit, it is possible to prevent a material having a low refractive index from being selected, and it is possible to make the radius of curvature of the most image side lens L34 appropriate. As a result, it is possible to suppress occurrence of spherical aberration. In addition, in a case of a configuration in which Conditional Expression (19-1) is satisfied instead of Conditional Expression (19), it is possible to obtain more favorable characteristics.

$$50 < vL34 < 100 \tag{19}$$

$$60 < vL34 < 85 \tag{19-1}$$

Assuming that a focal length of the most image side lens L34 is fL34 and the focal length of the rear attachment lens RAL is fRA, it is preferable that Conditional Expression (20)

is satisfied. By not allowing the result of Conditional Expression (20) to be equal to or less than the lower limit, it becomes easy to correct various aberrations. By not allowing the result of Conditional Expression (20) to be equal to or greater than the upper limit, it becomes easy to ensure a desired back focal length. In addition, in a case of a configuration in which Conditional Expression (20-1) is satisfied instead of Conditional Expression (20), it is possible to obtain more favorable characteristics.

$$0.1 < fL34/fRA < 0.4 \quad (20)$$

$$0.15 < fL34/fRA < 0.35 \quad (20\text{-}1)$$

In a case where any combination of Conditional Expressions (18), (19), and (20) is satisfied, there is an advantage in obtaining more favorable characteristics. Furthermore, in a case where the most image side lens L34 has a shape convex toward the image side and satisfies any combination of Conditional Expressions (18), (19) and (20), there is also an advantage in obtaining more favorable characteristics.

As a group configuration of the rear attachment lens RAL, for example, it is possible to adopt a three-group configuration in which the rear attachment lens RAL consists of, in order from the object side, a first lens group G1 having a negative refractive power, a second lens group G2 having a positive refractive power, and a third lens group G3 having a positive refractive power. Since a negative refractive power is assigned to the object side and a positive refractive power is assigned to the image side, it becomes easy to ensure the back focal length by positioning the object side principal point as close as possible to the image side. Further, by adopting a configuration in which the third lens group G3 disposed to be closest to the image side has a positive refractive power, it becomes easy to correct the spherical aberration and the field curvature caused by attachment of the rear attachment lens RAL.

The rear attachment lens RAL of the example shown in FIG. 3 has a three-group configuration consisting of, in order from the object side, the first lens group G1, the second lens group G2, and the third lens group G3. In the example of FIG. 3, the first lens group G1 consists of four lenses including the most object side lens L11 and the lenses L12 to L14 in order from the object side, the second lens group G2 consists of two lenses including lenses L21 to L22 in order from the object side, and the third lens group G3 consists of four lenses including the lenses L31 to L33 and the most image side lens L34 in order from the object side.

A preferable configuration in a case where the rear attachment lens RAL adopts the three-group configuration will be described below. The first lens group G1 consists of, in order from the object side, a most object side lens L11 that is a lens which has a negative refractive power and is disposed to be closest to an object side, and a cemented lens. The cemented lens included in the first lens group G1 is formed by cementing at least one negative lens and at least one positive lens.

In the case where the first lens group G1 is configured as described above, it is possible to effectively achieve a long focal length and ensure a desired back focal length by assigning a negative refractive power to a position closest to the main lens. In addition, by sharing the negative refractive power by the most object side lens L11 and the negative lens in the cemented lens, it is possible to easily suppress occurrence of various aberrations. In addition, by cementing at least one negative lens and at least one positive lens, there is an advantage in correction of chromatic aberration. Thus, it is possible to further suppress deterioration of optical performance due to manufacturing error such as eccentricity. As a result, it is possible to suppress high-order spherical aberration occurring in the negative lens within the cemented lens.

Assuming that a focal length of the first lens group G1 is fG1 and a focal length of the most object side lens L11 is fL11, it is preferable that Conditional Expression (2) is satisfied. By not allowing the result of Conditional Expression (2) to be equal to or less than the lower limit, it becomes easy to correct various aberrations. By not allowing the result of Conditional Expression (2) to be equal to or greater than the upper limit, it is possible to ensure a desired back focal length. In addition, in a case of a configuration in which Conditional Expression (2-1) is satisfied, it is possible to obtain more favorable characteristics.

$$0.5 < fG1/fL11 < 1.5 \quad (2)$$

$$0.6 < fG1/fL11 < 1.2 \quad (2\text{-}1)$$

Assuming that a focal length of the first lens group G1 is fG1 and a focal length of the rear attachment lens RAL is fRA, it is preferable that Conditional Expression (22) is satisfied. By not allowing the result of Conditional Expression (22) to be equal to or less than the lower limit, it is possible to ensure a desired back focal length and effectively achieve a long focal length. By not allowing the result of Conditional Expression (22) to be equal to or greater than the upper limit, it becomes easy to correct various aberrations. In addition, in a case of a configuration in which Conditional Expression (22-1) is satisfied, it is possible to obtain more favorable characteristics.

$$-0.5 < fG1/fRA < -0.01 \quad (22)$$

$$-0.3 < fG1/fRA < -0.05 \quad (22\text{-}1)$$

It is preferable that the second lens group G2 consists of a positive lens and a negative lens in order from the object side. In this case, it is possible to satisfactorily correct various aberrations generated in the first lens group G1 having a negative refractive power, and it is possible to easily correct longitudinal chromatic aberration.

In a case where the second lens group G2 consists of a positive lens and a negative lens in order from the object side, assuming that a partial dispersion ratio of the positive lens in the second lens group G2 between the g line and the F line is θgL21 and a partial dispersion ratio of the negative lens in the second lens group G2 between the g line and the F line is θgL22, it is preferable that Conditional Expression (13) is satisfied. By satisfying Conditional Expression (13), it is possible to suppress occurrence of the secondary chromatic aberration.

$$-0.05 < \theta gL21 - \theta gL22 < 0 \quad (13)$$

In a case where the second lens group G2 consists of a positive lens and a negative lens in order from the object side, assuming that a refractive index of the positive lens in the second lens group at the d line is NL21 and a refractive index of the negative lens in the second lens group G2 at the d line is NL22, it is preferable that Conditional Expression (14) is satisfied. By not allowing the result of Conditional Expression (14) to be equal to or less than the lower limit, the Petzval sum of the rear attachment lens RAL can be brought close to 0. As a result, it is possible to suppress occurrence of field curvature. By not allowing the result of Conditional Expression (14) to be equal to or greater than the upper limit, there is an advantage in correction of spherical aberration.

$$-0.45 < NL21 - NL22 < -0.25 \quad (14)$$

In a case where the second lens group G2 consists of a positive lens and a negative lens in order from the object side and satisfies Conditional Expressions (13) and (14), there is an advantage in obtaining more favorable characteristics.

More specifically, it is preferable that the second lens group G2 consists of a cemented lens in which a positive lens and a negative lens are cemented in order from the object side. In such a case, it is possible to suppress high-order spherical aberration. In a case where the second lens group G2 consists of the cemented lens described above and the positive lens included in the second lens group G2 has a biconvex shape, it is possible to more satisfactorily correct spherical aberration. Further, in a case where the second lens group G2 consists of the cemented lens described above and satisfies at least one of Conditional Expressions (13) or (14), there is an advantage in obtaining more favorable characteristics.

It is preferable that the third lens group G3 consists of a negative lens, a positive lens, a negative lens, and a positive lens, in order from the object side. As described above, since negative, positive, negative, positive lenses are disposed in order from the object side, it is possible to satisfactorily correct distortion. Since the positive lens is disposed to be closest to the image side, it is possible to minimize the incident angle of the off-axis principal ray onto the image plane 15.

In the case where the third lens group G3 consists of the above-mentioned four lenses, it is preferable that the lens closest to the object side in the third lens group G3 and the second lens from the object side in the third lens group G3 are cemented to each other. In such a case, it is possible to suppress the occurrence of high-order spherical aberration. In the case where the third lens group G3 consists of the four lenses described above, it is preferable that the third lens from the object side in the third lens group G3 has a meniscus shape convex toward the image side. In such a case, it is possible to suppress occurrence of spherical aberration and astigmatism.

In the case where the third lens group G3 consists of four lenses described above, assuming that a partial dispersion ratio of the lens closest to the object side in the third lens group between the g line and the F line is θgL31 and a partial dispersion ratio of the second lens from the object side in the third lens group between the g line and the F line is θgL32, it is preferable that Conditional Expression (3) is satisfied. By satisfying Conditional Expression (3), it is possible to suppress occurrence of the chromatic aberration. In addition, in a case of a configuration in which Conditional Expression (3-1) is satisfied instead of Conditional Expression (3), it is possible to obtain more favorable characteristics.

$$-0.02 < \theta gL31 - \theta gL32 < 0.02 \quad (3)$$

$$-0.01 < \theta gL31 - \theta gL32 < 0.01 \quad (3\text{-}1)$$

In the case where the third lens group G3 consists of four lenses described above, assuming that a refractive index of the lens closest to the object side in the third lens group at the d line is NL31 and a refractive index of the second lens from the object side in the third lens group at the d line is NL32, it is preferable that Conditional Expression (4) is satisfied. By not allowing the result of Conditional Expression (4) to be equal to or less than the lower limit, the Petzval sum of the rear attachment lens RAL can be brought close to 0. As a result, it is possible to suppress occurrence of field curvature. By not allowing the result of Conditional Expression (4) to be equal to or greater than the upper limit, there is an advantage in correction of spherical aberration. In addition, in a case of a configuration in which Conditional Expression (4-1) is satisfied instead of Conditional Expression (4), it is possible to obtain more favorable characteristics.

$$0.3 < NL31 - NL32 < 0.5 \quad (4)$$

$$0.35 < NL31 - NL32 < 0.45 \quad (4\text{-}1)$$

In a case where Conditional Expressions (3) and (4) are satisfied, there is an advantage in obtaining more favorable characteristics. Further, the lens closest to the object side in the third lens group G3 and the second lens from the object side in the third lens group G3 are cemented to each other. Thus, in the case where Conditional Expressions (3) and (4) are satisfied, there is also an advantage in obtaining more favorable characteristics.

In the case where the third lens group G3 consists of four lenses described above, assuming that a partial dispersion ratio of a third lens from the object side in the third lens group G3 between the g line and the F line is θgL33 and a partial dispersion ratio of a lens (most image side lens L34) closest to the image side in the third lens group G3 between the g line and the F line is θgL34, it is preferable that Conditional Expression (15) is satisfied. By satisfying Conditional Expression (15), it is possible to suppress occurrence of the secondary chromatic aberration. In addition, in a case of a configuration in which Conditional Expression (15-1) is satisfied instead of Conditional Expression (15), it is possible to obtain more favorable characteristics.

$$-0.04 < \theta gL33 - \theta gL34 < 0.04 \quad (15)$$

$$-0.02 < \theta gL33 - \theta gL34 < 0.035 \quad (15\text{-}1)$$

In the case where the third lens group G3 consists of four lenses described above, assuming that an Abbe number of the third lens from the object side in the third lens group G3 at the d line is vL33, it is preferable that Conditional Expression (16) is satisfied. By satisfying Conditional Expression (16), it is possible to suppress occurrence of lateral chromatic aberration. In addition, in a case of a configuration in which Conditional Expression (16-1) is satisfied instead of Conditional Expression (16), it is possible to obtain more favorable characteristics.

$$36 < vL33 < 85 \quad (16)$$

$$40 < vL33 < 75 \quad (16\text{-}1)$$

In the case where the third lens group G3 consists of four lenses described above, assuming that a refractive index of the third lens from the object side in the third lens group G3 at the d line is NL33, it is preferable that Conditional Expression (17) is satisfied. By not allowing the result of Conditional Expression (17) to be equal to or less than the lower limit, a desired back focal length is ensured while occurrence of spherical aberration is suppressed. As a result, there are advantages in achieving a long focal length and correcting distortion. By not allowing the result of Conditional Expression (17) to be equal to or greater than the upper limit, it is possible to select a material with a high transmittance on the short wavelength side, and it is possible to sufficiently reduce the change in the color tint of the transmitted light in a case where the rear attachment lens RAL is attached. Further, it is possible to select a material having an appropriate Abbe number, and it becomes easy to correct chromatic aberration. In addition, in a case of a configuration in which Conditional Expression (17-1) is satisfied instead of Conditional Expression (17), it is possible to obtain more favorable characteristics.

$$1.45 < NL33 < 1.95 \tag{17}$$

$$1.45 < NL33 < 1.9 \tag{17-1}$$

In a case where the third lens group G3 consists of the four lenses described above and satisfies any combination of Conditional Expressions (15), (16), and (17), there is an advantage in obtaining more favorable characteristics.

In the case where the third lens group G3 consists of four lenses described above, assuming that a focal length of the lens (most image side lens L34) closest to the image side in the third lens group G3 is fL34 and a focal length of the third lens from the object side in the third lens group G3 is fL33, it is preferable that Conditional Expression (21) is satisfied. By not allowing the result of Conditional Expression (21) to be equal to or less than the lower limit, it is possible to satisfactorily correct distortion, and it is possible to ensure a desired back focal length and effectively achieve a long focal length. By not allowing the result of Conditional Expression (21) to be equal to or greater than the upper limit, it is possible to suppress longitudinal chromatic aberration. In addition, in a case of a configuration in which Conditional Expression (21-1) is satisfied instead of Conditional Expression (21), it is possible to obtain more favorable characteristics.

$$-1 < fL34/fL33 < -0.2 \tag{21}$$

$$-0.8 < fL34/fL33 < -0.4 \tag{21-1}$$

In a case where the third lens from the object side in the third lens group G3 has a meniscus shape convex toward the image side and Conditional Expression (21) is satisfied, there is an advantage in obtaining more favorable characteristics.

Assuming that a composite focal length of the second lens group G2 and the third lens group G3 is fG23 and a focal length of the first lens group G1 is fG1, it is preferable that Conditional Expression (23) is satisfied. By not allowing the result of Conditional Expression (23) to be equal to or less than the lower limit, it becomes easy to correct various aberrations. By not allowing the result of Conditional Expression (23) to be equal to or greater than the upper limit, it is possible to ensure a desired back focal length and effectively achieve a long focal length. In addition, in a case of a configuration in which Conditional Expression (23-1) is satisfied, it is possible to obtain more favorable characteristics.

$$-2 < fG23/fG1 < -1 \tag{23}$$

$$-1.9 < fG23/fG1 < -1.6 \tag{23-1}$$

The above-mentioned configuration is a preferable configuration in the case where the rear attachment lens RAL adopts a three-group configuration.

Regardless of the group configuration, it is preferable that the rear attachment lens RAL adopt the following configuration. It is preferable that the rear attachment lens RAL includes a three cemented lens TG formed by cementing three lenses consisting of a negative lens, a positive lens, and a negative lens in order from the object side. In the case where such a three cemented lens TG is included, it is possible to satisfactorily correct field curvature and chromatic aberration.

Assuming that a partial dispersion ratio of the positive lens in the three cemented lens TG included in the rear attachment lens RAL between the g line and the F line is θgTL2 and a partial dispersion ratio of the negative lens closest to the image side in the three cemented lens TG between the g line and the F line is θgTL3, it is preferable that Conditional Expression (8) is satisfied. By satisfying Conditional Expression (8), it is possible to suppress occurrence of the secondary chromatic aberration.

$$-0.03 < \theta gTL2 - \theta gTL3 < 0.03 \tag{8}$$

Assuming that a refractive index of the positive lens in the three cemented lens TG at the d line is NTL2 and a refractive index of the negative lens closest to the image side in the three cemented lens TG at the d line is NTL3, it is preferable that Conditional Expression (9) is satisfied. By not allowing the result of Conditional Expression (9) to be equal to or less than the lower limit, it is possible to suppress occurrence of field curvature. By not allowing the result of Conditional Expression (9) to be equal to or greater than the upper limit, it becomes easy to correct spherical aberration. In addition, in a case of a configuration in which Conditional Expression (9-1) is satisfied instead of Conditional Expression (9), it is possible to obtain more favorable characteristics.

$$-0.35 < NTL2 - NTL3 < -0.15 \tag{9}$$

$$-0.3 < NTL2 - NTL3 < -0.2 \tag{9-1}$$

Assuming that an Abbe number of the positive lens in the three cemented lens TG at the d line is vTL2, it is preferable that Conditional Expression (10) is satisfied. By not allowing the result of Conditional Expression (10) to be equal to or less than the lower limit, it is possible to select a material having an appropriate partial dispersion ratio between the g line and the F line. By not allowing the result of Conditional Expression (10) to be equal to or greater than the upper limit, it is possible to use a highly dispersed material for the positive lens in the three cemented lens TG. Thus, it is possible to correct longitudinal chromatic aberration and realize high optical performance. In addition, in a case of a configuration in which Conditional Expression (10-1) is satisfied instead of Conditional Expression (10), it is possible to obtain more favorable characteristics.

$$20 < vTL2 < 40 \tag{10}$$

$$28 < vTL2 < 37 \tag{10-1}$$

In a case where the rear attachment lens RAL includes the above-mentioned three cemented lens TG, it is preferable to satisfy any combination of Conditional Expressions (8), (9), and (10). In such a case, it is possible to obtain more favorable characteristics.

Assuming that a distance on an optical axis from a lens surface closest to the object side in the rear attachment lens RAL to an object side principal point of the rear attachment lens RAL is ef, and a distance on the optical axis from the lens surface closest to the object side in the rear attachment lens RAL to a lens surface closest to the image side in the rear attachment lens RAL is RAT, it is preferable that Conditional Expression (11) is satisfied. By not allowing the result of Conditional Expression (11) to be equal to or less than the lower limit, it becomes easy to correct field curvature in a case where the rear attachment lens RAL is attached to the main lens ML. By not allowing the result of Conditional Expression (11) to be equal to or greater than the upper limit, it is possible to make the rear attachment lens RAL have an appropriate positive refractive power. As a result, it becomes easy to correct spherical aberration. In addition, in a case of a configuration in which Conditional Expression (11-1) is satisfied, it is possible to obtain more favorable characteristics.

$$1 < ef/RAT < 5 \tag{11}$$

$$1.5 < ef/RAT < 4 \tag{11-1}$$

Assuming that an air distance on the optical axis between the most object side lens L11 and the second lens from the object side of the rear attachment lens RAL is t and a distance on the optical axis from the lens surface closest to the object side in the rear attachment lens RAL to a lens surface closest to the image side in the rear attachment lens RAL is RAT, it is preferable that Conditional Expression (24) is satisfied. By not allowing the result of Conditional Expression (24) to be equal to or less than the lower limit, it is possible to increase the ray height of the on-axis rays incident into the second lens from the object side in the rear attachment lens RAL. As a result, it becomes easy to effectively achieve a long focal length and ensure a desired back focal length. By not allowing the result of Conditional Expression (24) to be equal to or greater than the upper limit, it becomes easy to achieve reduction in size, and it becomes easy to correct spherical aberration. In addition, in a case of a configuration in which Conditional Expression (24-1) is satisfied, it is possible to obtain more favorable characteristics.

$$0.06 < t/RAT < 0.14 \quad (24)$$

$$0.08 < t/RAT < 0.12 \quad (24\text{-}1)$$

It is preferable that the rear attachment lens RAL has at least nine lenses. In such a case, it is possible to satisfactorily correct various aberrations.

The lateral magnification of the rear attachment lens RAL is preferably 1.4 times or more, and more preferably 1.5 times or more in a state in which the combined optical system of the main lens ML and the rear attachment lens RAL is focused on the object at infinity. In such a case, it is possible to realize the rear attachment lens RAL having a function of enlarging an image size. More specifically, for example, by attaching the rear attachment lens RAL of the present embodiment to a main lens for a camera provided with a ⅔-inch type imaging element, the lens system can be used as a lens system for a camera provided with an imaging element compatible with a 1.25 inch type.

The above-mentioned preferred configurations and/or available configurations including the configurations relating to the conditional expressions may be any combination, and it is preferable to selectively adopt the configurations in accordance with required specification. Two preferred aspects of the rear attachment lens RAL, in which the above-mentioned configurations are combined, will be described below.

The rear attachment lens RAL of the first aspect has a positive refractive power as a whole, includes the most object side lens L11 and the most image side lens L34, and has a configuration that satisfies Conditional Expression (1). According to the rear attachment lens RAL of the first aspect, it is possible to minimize curvature of field, it is possible to effectively increase a long focal length, it is possible to ensure a desired back focal length, and it is possible to minimize an incident angle of the off-axial principal ray onto the image plane 15. As a result, it is possible to satisfactorily correct the secondary spectrum.

The rear attachment lens RAL of the second embodiment consists of, in order from the object side, a first lens group G1 having a negative refractive power, a second lens group G2 having a positive refractive power, and a third lens group G3 having a positive refractive power. The first lens group G1 consists of, in order from the object side, a most object side lens L11 and a cemented lens. The cemented lens is formed by cementing at least one negative lens and at least one positive lens. The second lens group G2 consists of, in order from the object side, a positive lens and a negative lens. In addition, the third lens group G3 consists of, in order from the object side, a negative lens, positive lens, a negative lens, and a positive lens. According to the rear attachment lens RAL of the second aspect, there is an advantage in correction of spherical aberration, curvature of field, chromatic aberration, and distortion. Thus, it is possible to effectively achieve a long focal length, ensure a desired back focal length, suppress deterioration in optical performance caused by the manufacturing error such as eccentricity, and minimize an incident angle of the off-axis principal rays onto the image plane 15.

Next, numerical examples of the main lens and numerical examples of the rear attachment lens of the present invention will be described.

[Main Lens]

FIG. 2 shows a lens configuration of the main lens. Table 1 shows basic lens data of the main lens, Table 2 shows specifications thereof, and Table 3 shows aspheric coefficients thereof. In Table 1, the column of the surface number shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line (a wavelength of 587.6 nm (nanometers)), the column of vd shows an Abbe number of each constituent element at the d line, and the column of θgF shows a partial dispersion ratio of each constituent element between the g line and the F line.

Here, reference signs of radii of curvature of surface shapes convex toward the object side are set to be positive, and reference signs of radii of curvature of surface shapes convex toward the image side are set to be negative. A value at the bottom place of D indicates a distance between the image plane 25 and the surface closest to the image side in the table. Table 1 additionally shows the aperture stop St and the optical member 24. In Table 1, in a place of a surface number of a surface corresponding to the aperture stop St, the surface number and a term of (St) are noted. The 55th to 59th surfaces in Table 1 correspond to the optical member 24, and the 55th to 56th surfaces thereof correspond to the optical member 14a.

It should be noted that the values shown in Table 1 are values in a state in which an object distanced from the first surface by 15 m (meters) is in focus. The main lens shown in Table 1 performs focusing by changing the distance between the fourth surface and the fifth surface, the distance between the eighth surface and the ninth surface, and the distance between the tenth surface and the eleventh surface.

Table 2 shows the focal length f, the back focal length Bf at the air conversion distance, the F number FNo., and the maximum total angle of view 2ω, on the basis of d line. [°] in the place of 2ω indicates that the unit thereof is a degree.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric coefficients of the respective aspheric surfaces. The "E±n" (n: an integer) in numerical values of the aspheric coefficients of Table 3 indicates "×10$^{\pm n}$". The aspheric coefficients are values of the coefficients KA and Am (m=4, 6, 8, 10) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Main lense

| Surface Number | R | D | Nd | vd | θgF |
|---|---|---|---|---|---|
| 1 | 3475.37020 | 4.400 | 1.83400 | 37.17 | 0.57761 |
| 2 | 372.49550 | 5.036 | | | |
| 3 | 366.92090 | 23.906 | 1.43387 | 95.15 | 0.53734 |
| 4 | −682.92360 | 24.153 | | | |
| 5 | 454.16050 | 18.221 | 1.43387 | 95.15 | 0.53734 |
| 6 | −986.97900 | 0.110 | | | |
| 7 | 253.28170 | 19.621 | 1.43387 | 95.15 | 0.53734 |
| 8 | 1947.23320 | 11.047 | | | |
| 9 | 173.10490 | 13.306 | 1.43875 | 94.97 | 0.53469 |
| 10 | 292.31820 | 2.433 | | | |
| *11 | 841.94480 | 2.800 | 1.95375 | 32.32 | 0.59004 |
| 12 | 64.11930 | 5.991 | | | |
| 13 | −139.91770 | 1.700 | 2.00100 | 29.14 | 0.59978 |
| 14 | 103.98520 | 6.248 | | | |
| 15 | −79.67950 | 1.700 | 1.95375 | 32.32 | 0.59004 |
| 16 | 86.50570 | 6.054 | 1.84666 | 23.82 | 0.61600 |
| 17 | −153.64380 | 0.120 | | | |
| 18 | 487.29660 | 11.213 | 1.80809 | 22.76 | 0.63078 |
| 19 | −38.04250 | 1.700 | 1.81600 | 46.63 | 0.55721 |
| 20 | −403.34730 | D4, | | | |
| 21 | 152.97190 | 9.081 | 1.59282 | 68.69 | 0.54583 |
| *22 | −317.08880 | 8.348 | | | |
| 23 | 126.92620 | 12.271 | 1.43700 | 95.00 | 0.53267 |
| 24 | −172.59040 | 2.000 | 1.59270 | 35.30 | 0.59328 |
| 25 | −585.37410 | 0.120 | | | |
| *26 | 225.13900 | 9.621 | 1.43700 | 95.00 | 0.53267 |
| 27 | −151.72220 | 0.120 | | | |
| 28 | 263.39030 | 2.000 | 1.80000 | 29.85 | 0.60194 |
| 29 | 88.75530 | 11.732 | 1.43700 | 95.00 | 0.53267 |
| 30 | −232.38460 | 2.344 | | | |
| 31 (St) | ∞ | 4.199 | | | |
| 32 | −163.69640 | 1.500 | 1.78800 | 47.38 | 0.55629 |
| 33 | 66.65790 | 0.120 | | | |
| 34 | 46.21670 | 4.085 | 1.76182 | 26.52 | 0.61337 |
| 35 | 152.40460 | 2.856 | | | |
| 36 | −98.80290 | 1.500 | 1.48749 | 70.24 | 0.53032 |
| 37 | 67.88830 | 8.212 | | | |
| 38 | −103.21690 | 1.800 | 1.83481 | 42.72 | 0.56506 |
| 39 | 62.98510 | 10.179 | 1.84666 | 23.82 | 0.61600 |
| 40 | −74.42740 | 0.848 | | | |
| 41 | −63.42070 | 3.496 | 1.95375 | 32.32 | 0.59004 |
| 42 | 101.43260 | 7.112 | 1.60311 | 60.68 | 0.54232 |
| 43 | −57.80400 | 0.120 | | | |
| 44 | 127.80510 | 19.089 | 1.61772 | 49.82 | 0.55974 |
| 45 | −5769.36940 | 7.179 | | | |
| 46 | 244.77040 | 5.729 | 1.58913 | 61.18 | 0.54108 |
| 47 | −108.15830 | 0.120 | | | |
| 48 | 234.38680 | 7.406 | 1.95375 | 32.32 | 0.59004 |
| 49 | 50.86610 | 0.702 | | | |
| 50 | 51.87220 | 7.381 | 1.58913 | 61.18 | 0.54108 |
| 51 | −74.14230 | 0.150 | | | |
| 52 | 64.97840 | 5.749 | 1.48749 | 70.24 | 0.53032 |
| 53 | −92.63120 | 3.812 | 1.95375 | 32.32 | 0.59004 |

TABLE 1-continued

Main lense

| Surface Number | R | D | Nd | vd | θgF |
|---|---|---|---|---|---|
| 54 | −6201.45070 | 0.250 | | | |
| 55 | ∞ | 1.000 | 1.51633 | 64.14 | 0.53422 |
| 56 | ∞ | 12.038 | | | |
| 57 | ∞ | 33.000 | 1.60863 | 46.60 | 0.56822 |
| 58 | ∞ | 13.200 | 1.51633 | 64.14 | 0.53422 |
| 59 | ∞ | 5.500 | | | |

TABLE 2

Main lense

| | |
|---|---|
| f | 9.269 |
| Bf | 47.667 |
| FNo. | 1.76 |
| 2ω[°] | 65.4 |

TABLE 3

Main lense

| Surface Number | 11 | 22 | 26 |
|---|---|---|---|
| KA | 1.0000000E+00 | 1.0000000E+00 | 1.0000000E+00 |
| A4 | 2.7395225E−07 | 1.1987876E−07 | −4.8883780E−07 |
| A6 | −4.8949478E−11 | 2.4237606E−11 | 2.3182674E−11 |
| A8 | 1.8491556E−13 | −2.9894229E−15 | −3.2052197E−15 |
| A10 | −1.9679971E−16 | −3.3833557E−19 | 9.7256769E−20 |

Figure 6:
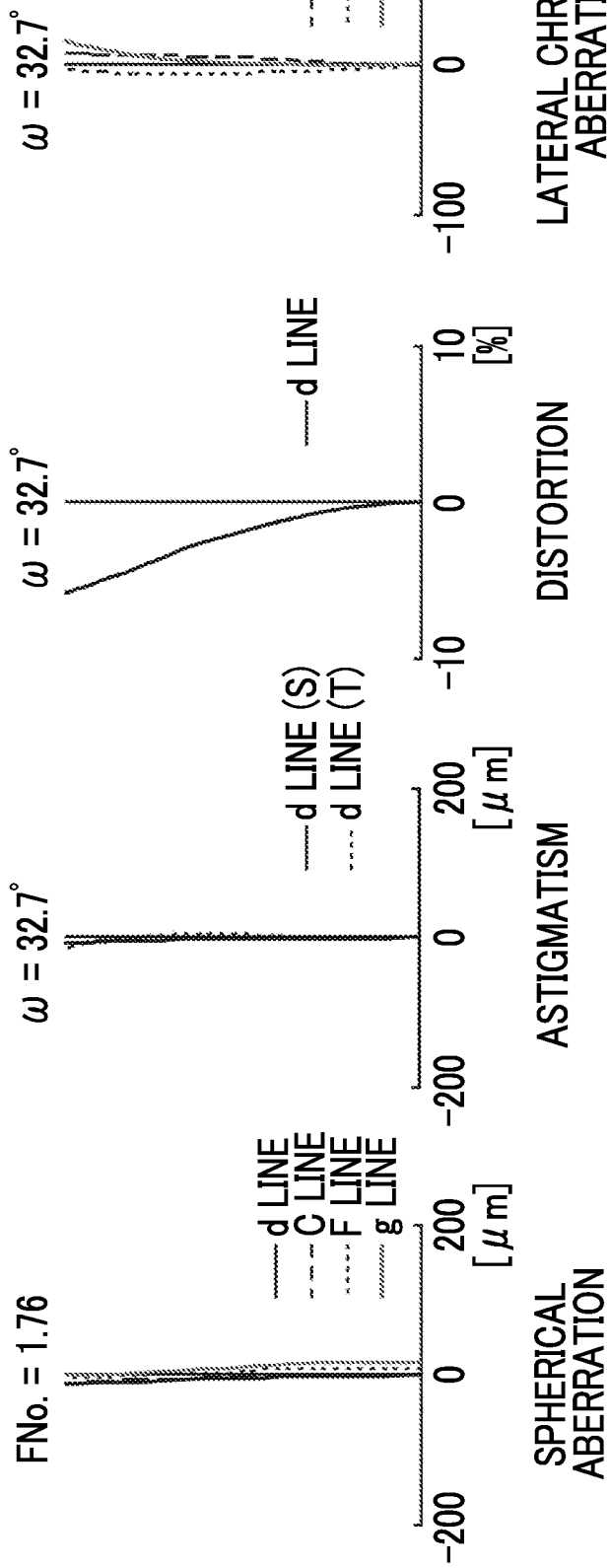
FIG. 6 is an aberration diagram illustrating various aberrations of a main lens of FIG. 2, and shows spherical aberration, astigmatism, distortion, and lateral chromatic aberration, in order from the left side.

FIG. 6 shows aberration diagrams of the main lens in a state where the object distanced by 15 m (meters) is in focus. In FIG. 6, in order from the left side, spherical aberration, astigmatism, distortion, and lateral chromatic aberration are shown. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram, FNo. indicates an F number. In the other aberration diagrams, ω indicates a half angle of view.

Reference signs, meanings, and description methods of the above-mentioned respective data pieces are the same as those in the following examples unless otherwise noted. Therefore, in the following description, repeated description will be omitted.

Example 1

FIG. 3 is a view of a lens configuration of a rear attachment lens of Example 1. The rear attachment lens of Example 1 is the above-mentioned three-group configuration. The first lens group G1 consists of a most object side lens L11 and lenses L12 to L14 in order from the object side.

The second lens group G2 consists of lenses L21 and L22 in order from the object side. The third lens group G3 consists of lenses L31 to L33 and a most image side lens L34 in order from the object side. The lenses L12 to L14 are cemented so as to constitute a three cemented lens TG. The lens L21 and the lens L22 are cemented. The lens L31 and the lens L32 are cemented.

Figure 7:
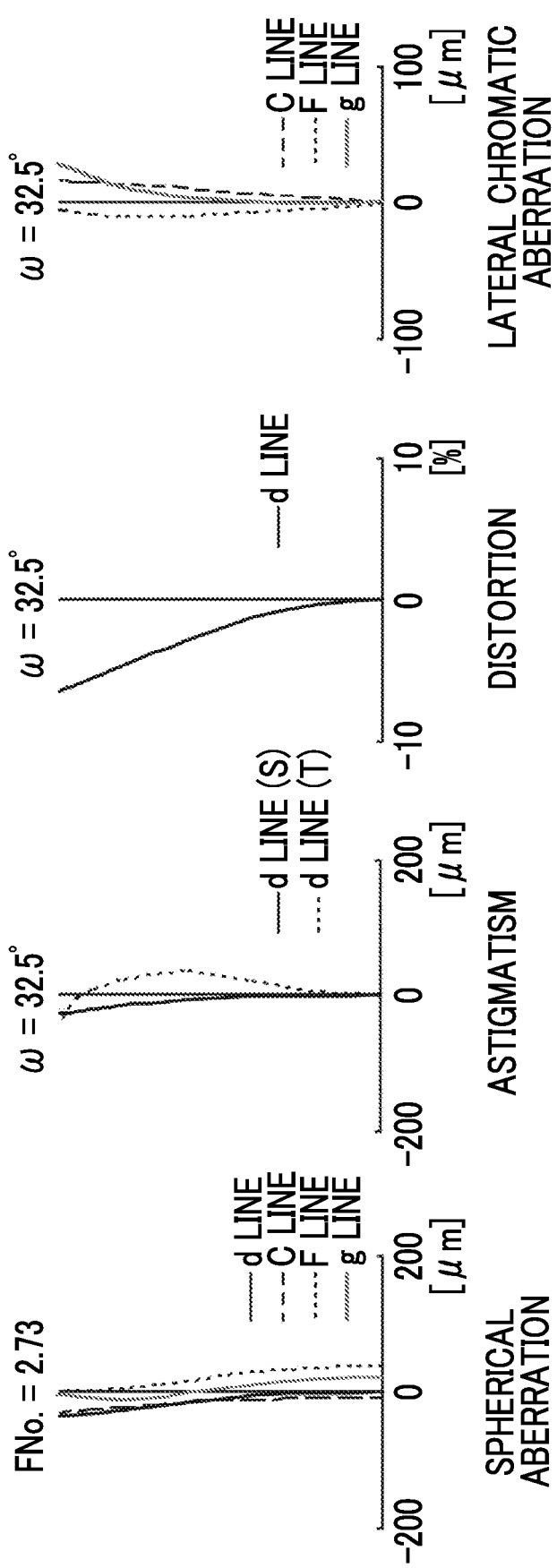
FIG. 7 shows various aberration diagrams of a combined optical system in which the rear attachment lens of Example 1 of the present invention is attached to the main lens, and shows spherical aberration, astigmatism, distortion, and lateral chromatic aberration, in order from the left side.

Table 4 shows the basic lens data of the rear attachment lens and the optical member 14b of Example 1. In Table 4, the 57th to 72nd surfaces correspond to the rear attachment lens of Example 1, and the 73rd to 75th surfaces correspond to the optical member 14b. In a case where the lens system shown in FIG. 1 is constituted by attaching the rear attachment lens to the main lens, in order to install a configuration shown in Table 4 instead of the 56th to 59th surfaces of Table 1, in Table 4, the surface numbers are assigned from the 56th surface. That is, the 57th surface in Table 4 corresponds to the lens surface on the object side of the most object side lens L11, and the distance between the 56th surface and the 57th surface corresponds to the surface on the optical axis between the optical member 14a and the most object side lens L11. This point is the same in Examples 2 and 3 described later. A value at the bottom place of D in Table 4 indicates a distance between the image plane 15 and the surface closest to the image side in the table. Table 5 shows the specifications of the combined optical system in which the 56th to the 75th surfaces of Table 4 are attached to the 1st to the 55th surfaces of Table 1, and FIG. 7 shows the aberration diagrams in a state where the object distanced by 15 m (meters) in the combined optical system is in focus.

TABLE 4

Example 1

| Surface Number | R | D | Nd | vd | θgF |
|---|---|---|---|---|---|
| 56 | ∞ | 9.762 | | | |
| 57 | 51.45755 | 1.100 | 1.69560 | 59.05 | 0.54348 |
| 58 | 17.94136 | 6.593 | | | |
| 59 | −121.43539 | 1.210 | 1.55032 | 75.50 | 0.54001 |
| 60 | 19.42000 | 14.454 | 1.68893 | 31.07 | 0.60041 |
| 61 | −19.18936 | 1.200 | 1.90366 | 31.31 | 0.59481 |
| 62 | −1520.86191 | 0.300 | | | |
| 63 | 72.01176 | 8.228 | 1.59270 | 35.31 | 0.59336 |
| 64 | −31.49394 | 1.250 | 1.89286 | 20.36 | 0.63944 |
| 65 | −65.31146 | 0.458 | | | |
| 66 | −150.88604 | 1.250 | 2.00100 | 29.13 | 0.59952 |
| 67 | 38.03698 | 11.646 | 1.59270 | 35.31 | 0.59336 |
| 68 | −37.17651 | 0.200 | | | |
| 69 | −51.92550 | 1.250 | 1.84850 | 43.79 | 0.56197 |
| 70 | −319.57198 | 0.200 | | | |
| 71 | 151.91209 | 10.346 | 1.63246 | 63.77 | 0.54215 |
| 72 | −33.96900 | 11.019 | | | |
| 73 | ∞ | 63.000 | 1.60859 | 46.44 | 0.56664 |
| 74 | ∞ | 8.700 | 1.51633 | 64.06 | 0.53479 |
| 75 | ∞ | 6.000 | | | |

TABLE 5

Main lens + Example 1

| | |
|---|---|
| f | 15.772 |
| Bf | 61.921 |
| FNo. | 2.73 |
| 2ω[°] | 65.0 |

Example 2

Figure 4:
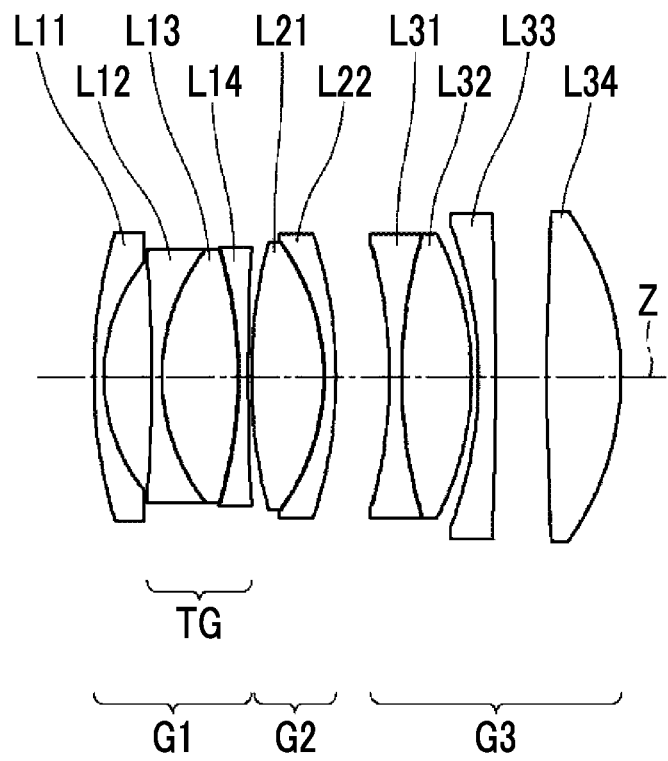
FIG. 4 is a cross-sectional view illustrating a configuration of a rear attachment lens of Example 2 of the present invention.

FIG. 4 is a view of a lens configuration of a rear attachment lens of Example 2. The rear attachment lens of Example 2 is the above-mentioned three-group configuration. The first lens group G1 consists of a most object side lens L11 and lenses L12 to L14 in order from the object side. The second lens group G2 consists of lenses L21 and L22 in order from the object side. The third lens group G3 consists of lenses L31 to L33 and a most image side lens L34 in order from the object side. The lenses L12 to L14 are cemented so as to constitute a three cemented lens TG. The lens L21 and the lens L22 are cemented. The lens L31 and the lens L32 are cemented.

Figure 8:
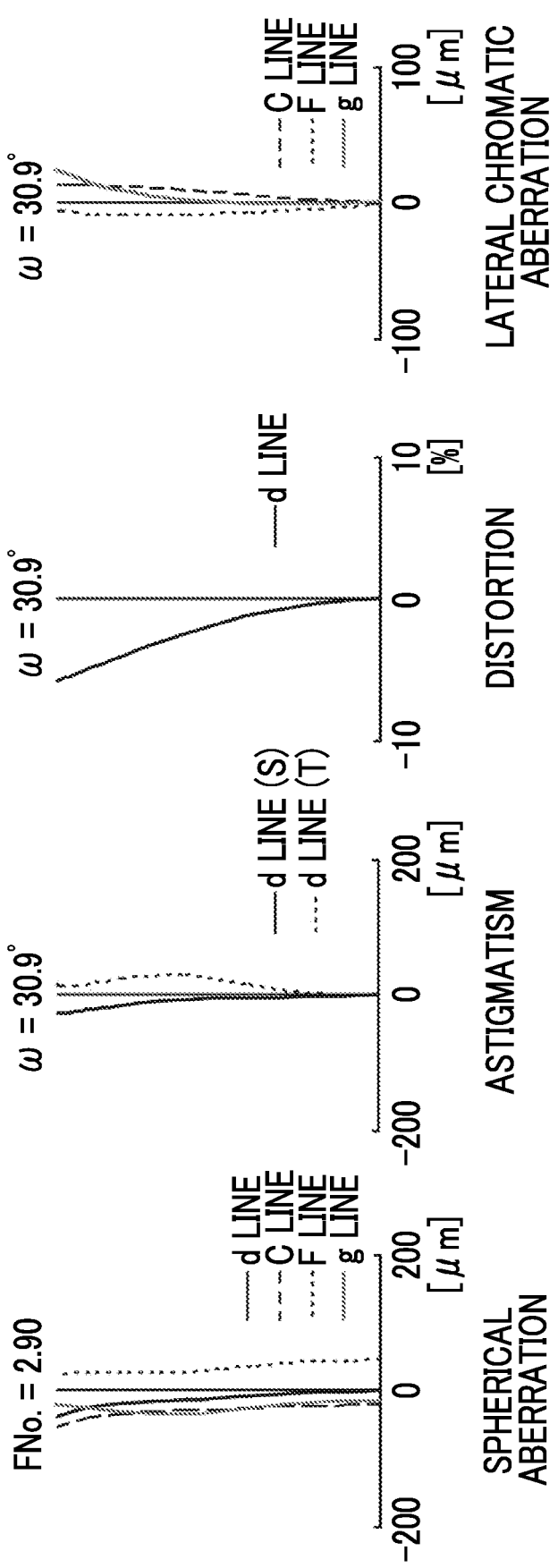
FIG. 8 shows various aberration diagrams of a combined optical system in which the rear attachment lens of Example 2 of the present invention is attached to the main lens, and shows spherical aberration, astigmatism, distortion, and lateral chromatic aberration, in order from the left side.

Table 6 shows the basic lens data of the rear attachment lens and the optical member 14b of Example 2. In a manner similar to Example 1, the surface numbers are assigned to 56th surface in Table 6. In Table 6, the 57th to 72nd surfaces correspond to the rear attachment lens of Example 2, and the 73rd to 75th surfaces correspond to the optical member 14b. Table 7 shows the specifications of the combined optical system in which the 56th to the 75th surfaces of Table 6 are attached to the 1st to the 55th surfaces of Table 1, and FIG. 8 shows the aberration diagrams in a state where the object distanced by 15 m (meters) in the combined optical system is in focus.

TABLE 6

Example 2

| Surface Number | R | D | Nd | vd | θgF |
|---|---|---|---|---|---|
| 56 | ∞ | 8.768 | | | |
| 57 | 47.96285 | 1.000 | 1.69680 | 55.53 | 0.54341 |
| 58 | 17.71838 | 4.591 | | | |
| 59 | −166.39006 | 1.020 | 1.56908 | 71.34 | 0.54530 |
| 60 | 19.79151 | 7.427 | 1.71736 | 29.52 | 0.60483 |
| 61 | −42.49375 | 1.000 | 1.92119 | 23.96 | 0.62025 |
| 62 | 247.38074 | 0.247 | | | |
| 63 | 51.13971 | 7.036 | 1.59270 | 35.31 | 0.59336 |
| 64 | −22.05405 | 1.200 | 2.00100 | 29.13 | 0.59952 |
| 65 | −43.48351 | 5.000 | | | |
| 66 | −48.60975 | 1.200 | 2.00100 | 29.13 | 0.59952 |
| 67 | 48.24671 | 6.815 | 1.59270 | 35.31 | 0.59336 |
| 68 | −29.88111 | 0.646 | | | |
| 69 | −40.57793 | 1.623 | 1.48749 | 70.24 | 0.53007 |
| 70 | −609.46036 | 5.000 | | | |
| 71 | 290.92228 | 7.126 | 1.49700 | 81.54 | 0.53748 |
| 72 | −27.69011 | 11.003 | | | |
| 73 | ∞ | 63.000 | 1.60859 | 46.44 | 0.56664 |
| 74 | ∞ | 8.700 | 1.51633 | 64.06 | 0.53479 |
| 75 | ∞ | 6.000 | | | |

TABLE 7

Main lens + Example 2

| | |
|---|---|
| f | 16.689 |
| Bf | 61.907 |
| FNo. | 2.90 |
| 2ω[°] | 61.8 |

Example 3

Figure 5:
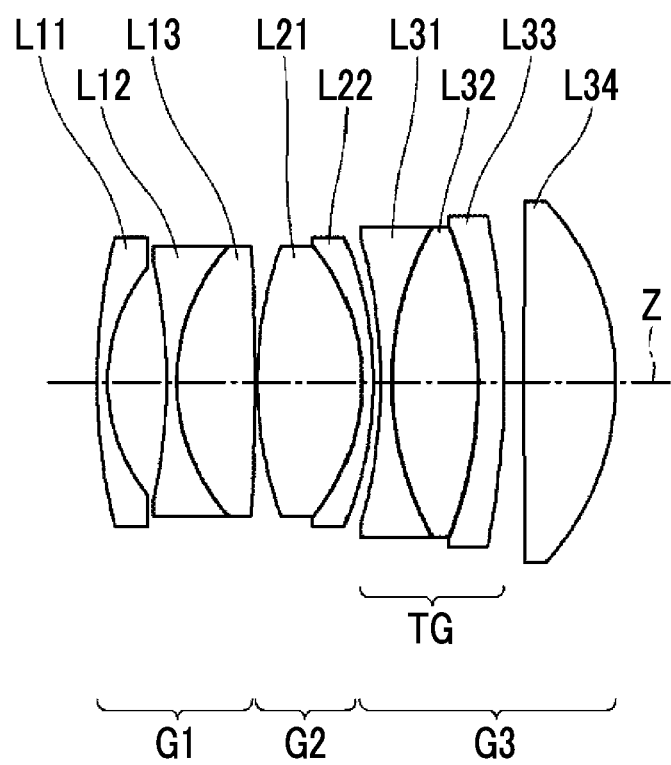
FIG. 5 is a cross-sectional view illustrating a configuration of a rear attachment lens of Example 3 of the present invention.

FIG. 5 is a view of a lens configuration of a rear attachment lens of Example 3. The rear attachment lens of Example 3 is the above-mentioned three-group configuration. The first lens group G1 consists of a most object side lens L11 and lenses L12 and L13 in order from the object side. The second lens group G2 consists of lenses L21 and L22 in order from the object side. The third lens group G3 consists of lenses L31 to L33 and a most image side lens L34 in order from the object side. The lens L12 and the lens L13 are cemented. The lens L21 and the lens L22 are cemented. The lenses L31 to L33 are cemented so as to constitute a three cemented lens TG.

Figure 9:
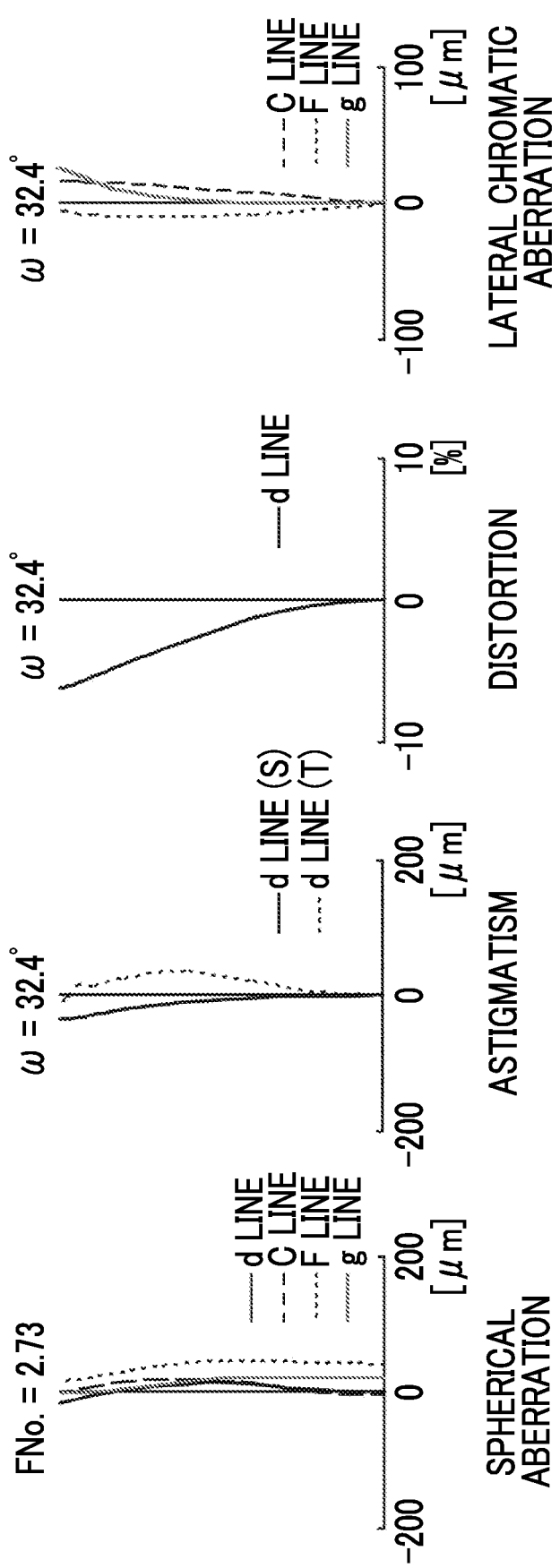
FIG. 9 shows various aberration diagrams of a combined optical system in which the rear attachment lens of Example 3 of the present invention is attached to the main lens, and shows spherical aberration, astigmatism, distortion, and lateral chromatic aberration, in order from the left side.

Table 8 shows the basic lens data of the rear attachment lens and the optical member 14b of Example 3. In a manner similar to Example 1, the surface numbers are assigned to 56th surface in Table 8. In Table 8, the 57th to 70th surfaces correspond to the rear attachment lens of Example 3, and the 71st to 73rd surfaces correspond to the optical member 14b. Table 9 shows the specifications of the combined optical system in which the 56th to the 73rd surfaces of Table 8 are attached to the 1st to the 55th surfaces of Table 1, and FIG. 9 shows the aberration diagrams in a state where the object distanced by 15 m (meters) in the combined optical system is in focus.

TABLE 8

Example 3

| Surface Number | R | D | Nd | vd | θgF |
|---|---|---|---|---|---|
| 56 | ∞ | 9.758 | | | |
| 57 | 57.22615 | 1.000 | 1.75500 | 52.32 | 0.54765 |
| 58 | 17.38200 | 5.695 | | | |
| 59 | −52.84375 | 1.020 | 1.49700 | 81.54 | 0.53748 |
| 60 | 19.35240 | 7.604 | 1.66680 | 33.05 | 0.59578 |
| 61 | −218.13920 | 0.200 | | | |
| 62 | 38.61787 | 10.020 | 1.58144 | 40.75 | 0.57757 |
| 63 | −20.55999 | 1.100 | 2.00100 | 29.13 | 0.59952 |
| 64 | −36.57386 | 0.708 | | | |
| 65 | −50.72771 | 1.100 | 2.00100 | 29.13 | 0.59952 |
| 66 | 30.88792 | 8.372 | 1.59270 | 35.31 | 0.59336 |
| 67 | −41.31280 | 2.500 | 1.88300 | 40.80 | 0.56557 |
| 68 | −81.49953 | 1.885 | | | |
| 69 | 3626.69923 | 8.891 | 1.51633 | 64.14 | 0.53531 |
| 70 | −25.88302 | 11.017 | | | |
| 71 | ∞ | 63.000 | 1.60859 | 46.44 | 0.56664 |
| 72 | ∞ | 8.700 | 1.51633 | 64.06 | 0.53479 |
| 73 | ∞ | 6.000 | | | |

TABLE 9

Main lens + Example 3

| f | 15.765 |
|---|---|
| Bf | 61.919 |
| FNo. | 2.73 |
| 2ω[°] | 64.8 |

Table 10 shows the corresponding values of Conditional Expressions (1) to (24) of the rear attachment lenses of Examples 1 to 3. It should be noted that, in Examples 1 to 3, the d line is set as the reference wavelength, and the values shown in Table 10 are values at the reference wavelength.

TABLE 10

| Expression Number | | Example 1 | Example 2 | Example 3 |
|---|---|---|---|---|
| (1) | θgL11 + 0.001625 × vL11 | 0.63944 | 0.63365 | 0.63267 |
| (2) | fG1/fL11 | 0.68 | 0.81 | 1.14 |
| (3) | θgL31 − θgL32 | 0.00616 | 0.00616 | 0.00616 |
| (4) | NL31 − NL32 | 0.4083 | 0.4083 | 0.4083 |
| (5) | NL11 | 1.69560 | 1.69680 | 1.75500 |
| (6) | vL11 | 59.05 | 55.53 | 52.32 |
| (7) | fL11/fRA | −0.30 | −0.13 | −0.14 |
| (8) | θgTL2 − θgTL3 | 0.00560 | −0.01542 | 0.02779 |
| (9) | NTL2 − NTL3 | −0.21473 | −0.20383 | −0.29030 |
| (10) | vTL2 | 31.07 | 29.52 | 35.31 |

TABLE 10-continued

| Expression Number | | Example 1 | Example 2 | Example 3 |
|---|---|---|---|---|
| (11) | ef/RAT | 1.553 | 3.746 | 2.845 |
| (12) | θgL11 | 0.54348 | 0.54341 | 0.54765 |
| (13) | θgL21 − θgL22 | −0.04608 | −0.00616 | −0.02195 |
| (14) | NL21 − NL22 | −0.30016 | −0.40830 | −0.41956 |
| (15) | θgL33 − θgL34 | 0.01982 | −0.00741 | 0.03026 |
| (16) | vL33 | 43.79 | 70.24 | 40.80 |
| (17) | NL33 | 1.84850 | 1.48749 | 1.88300 |
| (18) | NL34 | 1.63246 | 1.49700 | 1.51633 |
| (19) | vL34 | 63.77 | 81.54 | 64.14 |
| (20) | fL34/fRA | 0.34 | 0.16 | 0.21 |
| (21) | fL34/fL33 | −0.63 | −0.57 | −0.51 |
| (22) | fG1/fRA | −0.21 | −0.10 | −0.16 |
| (23) | fG23/fG1 | −1.80 | −1.82 | −1.70 |
| (24) | t/RAT | 0.110 | 0.090 | 0.114 |

As can be seen from the above-mentioned data, each of the rear attachment lenses of Examples 1 to 3 is attached to the main lens so as to have an effect of increasing the focal length of the whole lens system after the attachment equal to or greater than 1.7 times than the focal length of the main lens. In addition, the back focal length is sufficiently ensured, and various aberrations such as chromatic aberration are satisfactorily corrected. As a result, the rear attachment lenses have high optical performance.

Figure 10:
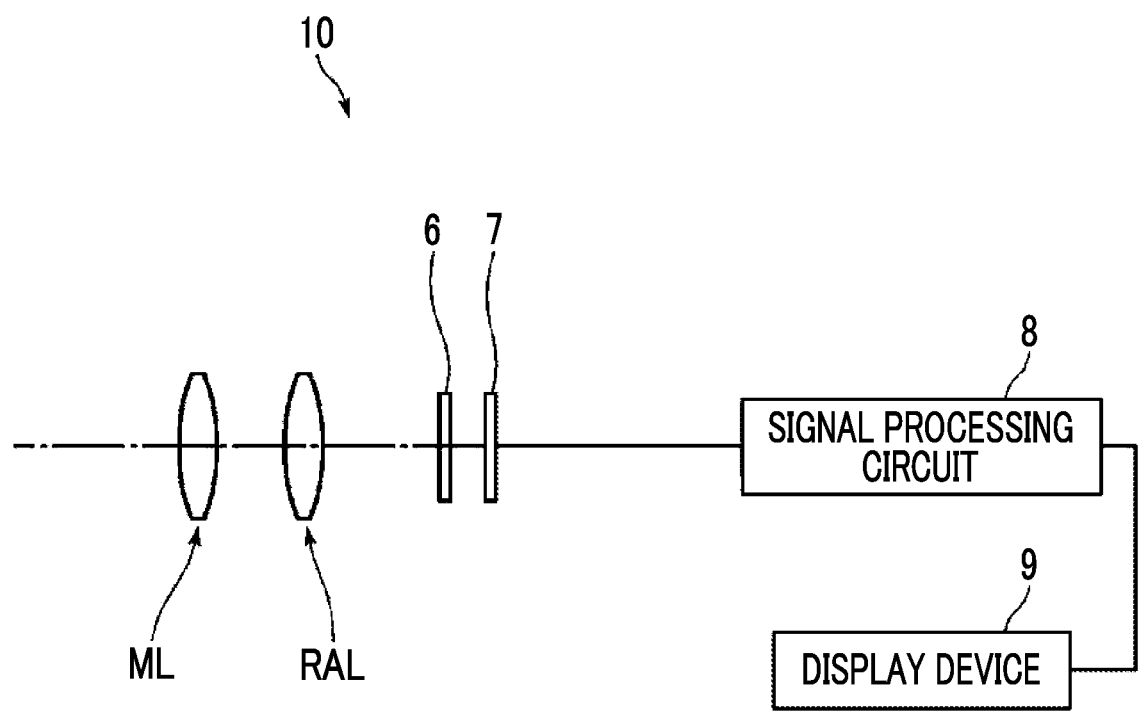
FIG. 10 is a schematic configuration diagram of an imaging apparatus according to an embodiment of the present invention.

Next, an imaging apparatus 10 according to an embodiment of the present invention will be described. FIG. 10 shows a schematic configuration diagram of the imaging apparatus 10 using the rear attachment lens RAL according to an embodiment of the present invention. Examples of the imaging apparatus 10 include a movie imaging camera, a broadcast camera, a movie imaging camera, a digital camera, a video camera, a surveillance camera, and the like.

The imaging apparatus 10 comprises the main lens ML, and the rear attachment lens RAL that is detachably attached to the image side of the main lens ML. It should be noted that FIG. 10 schematically shows the main lens ML and the rear attachment lens RAL. The imaging apparatus 10 shown in FIG. 10 comprises an imaging lens system that consists of the rear attachment lens RAL and the main lens ML, a filter 6 that has a function such as a lowpass filter disposed on the image side of the imaging lens system, an imaging element 7 that is disposed on the image side of the filter 6, a signal processing circuit 8, and a display device 9. It should be noted that the imaging apparatus 10 may comprise a zoom control unit that is for performing zooming of the main lens ML, and/or a focus control unit that is for performing focusing.

The imaging element 7 converts an optical image, which is formed through the imaging lens system, into an electrical signal. For example, as the imaging element 7, it is possible to use a charge coupled device (CCD), complementary metal oxide semiconductor (CMOS), and the like. The imaging element 7 is disposed such that the imaging surface thereof is coplanar with the image plane of the imaging lens system. An image, which is captured through the imaging lens system, is formed on the imaging surface of the imaging element 7, an output signal of the image from the imaging element 7 is calculated by the signal processing circuit 8, and the image is displayed on the display device 9.

The present invention has been hitherto described through embodiments and examples, but the present invention is not limited to the above-mentioned embodiments and examples, and may be modified into various forms. For example, the radius of curvature, the surface distance, the refractive index, and the Abbe number of each lens are not limited to the values shown in the numerical examples, and different values may be used therefor.

What is claimed is:

1. A rear attachment lens that is attached to an image side of a main lens as an imaging lens so as to change a focal length of the whole lens system after attachment to a focal length longer than a focal length of the main lens, the rear attachment lens comprising:
   a most object side lens that is a lens which has a negative refractive power and is disposed to be closest to an object side; and
   a most image side lens that is a lens which has a positive refractive power and is disposed to be closest to the image side,
   wherein the rear attachment lens has a positive refractive power as a whole, and
   wherein assuming that a partial dispersion ratio of the most object side lens between a g line and an F line is θgL11, and an Abbe number of the most object side lens at a d line is νL11, Conditional Expression (1) below is satisfied:

$0.62 < \theta gL11 + 0.001625 \times \nu L11 < 0.65$     (1).

2. The rear attachment lens according to claim 1, wherein assuming that a refractive index the most object side lens at the d line is NL11, and an Abbe number of the most object side lens at the d line is νL11, Conditional Expressions (5) and (6) below are satisfied:

$1.53 < NL11 < 1.8$     (5)

$45 < \nu L11 < 75$     (6).

3. The rear attachment lens according to claim 1, wherein assuming that a focal length of the most object side lens is fL11 and a focal length of the rear attachment lens is fRA, Conditional Expression (7) below is satisfied:

$-0.5 < fL11/fRA < -0.05$     (7).

4. The rear attachment lens according to claim 1, further comprising:
   a three cemented lens that is formed by cementing three lenses consisting of a negative lens, a positive lens, and a negative lens, in order from the object side,
   wherein assuming that a partial dispersion ratio of the positive lens in the three cemented lens between the g line and the F line is θgTL2, a partial dispersion ratio of the negative lens closest to the image side in the three cemented lens between the g line and the F line is θgTL3, a refractive index of the positive lens in the three cemented lens at the d line is NTL2, a refractive index of the negative lens closest to the image side in the three cemented lens at the d line is NTL3, and an Abbe number of the positive lens in the three cemented lens at the d line is νTL2, Conditional Expressions (8), (9), and (10) below are satisfied:

$-0.03 < \theta gTL2 - \theta gTL3 < 0.03$     (8)

$-0.35 < NTL2 - NTL3 < -0.15$     (9)

$20 < \nu TL2 < 40$     (10).

5. The rear attachment lens according to claim 1, wherein assuming that a distance on an optical axis from a lens surface closest to the object side in the rear attachment lens to an object side principal point of the rear attachment lens is ef, and a distance on the optical axis from the lens surface closest to the object side in the rear attachment lens to a lens surface closest to the image side in the rear attachment lens is RAT, Conditional Expression (11) below is satisfied:

$1 < ef/RAT < 5$     (11).

6. The rear attachment lens according to claim 1, wherein Conditional Expression (1-1) below is satisfied:

$0.63 < \theta gL11 + 0.001625 \times \nu L11 < 0.64$     (1-1).

7. The rear attachment lens according to claim 2, wherein Conditional Expression (5-1) below is satisfied:

$1.55 < NL11 < 1.76$     (5-1).

8. The rear attachment lens according to claim 2, wherein Conditional Expression (6-1) below is satisfied:

$50 < \nu L11 < 70$     (6-1).

9. The rear attachment lens according to claim 3, wherein Conditional Expression (7-1) below is satisfied:

$-0.4 < fL11/fRA < -0.1$     (7-1).

10. The rear attachment lens according to claim 4, wherein Conditional Expression (9-1) below is satisfied:

$-0.3 < NTL2 - NTL3 < -0.2$     (9-1).

11. The rear attachment lens according to claim 4, wherein Conditional Expression (10-1) below is satisfied:

$28 < \nu TL2 < 37$     (10-1).

12. The rear attachment lens according to claim 5, wherein Conditional Expression (11-1) below is satisfied:

$1.5 < ef/RAT < 4$     (11-1).

13. An imaging apparatus comprising:
    the main lens; and
    the rear attachment lens according to claim 1.

14. A rear attachment lens that is attached to an image side of a main lens as an imaging lens so as to change a focal length of the whole lens system after attachment to a focal length longer than a focal length of the main lens, the rear attachment lens consisting of, in order from the object side:
    a first lens group that has a negative refractive power;
    a second lens group that has a positive refractive power; and
    a third lens group that has a positive refractive power,
    wherein the first lens group consists of, in order from the object side, a most object side lens that is a lens which has a negative refractive power and is disposed to be closest to an object side, and a cemented lens that is formed by cementing at least one negative lens and at least one positive lens,
    wherein the second lens group consists of, in order from the object side, a positive lens and a negative lens, and
    wherein the third lens group consists of, in order from the object side, a negative lens, a positive lens, a negative lens, and a positive lens.

15. The rear attachment lens according to claim 14, wherein assuming that a focal length of the first lens group is fG1 and a focal length of the most object side lens is fL11, Conditional Expression (2) below is satisfied:

$0.5 < fG1/fL11 < 1.5$     (2).

16. The rear attachment lens according to claim 14,
    wherein a lens closest to the object side in the third lens group and a second lens from the object side in the third lens group are cemented to each other, and
    wherein assuming that a partial dispersion ratio of the lens closest to the object side in the third lens group between the g line and the F line is θgL31, a partial dispersion ratio of the second lens from the object side in the third lens group between the g line and the F line is θgL32, a refractive index of the lens closest to the object side in the third lens group at the d line is NL31, and a refractive index of the second lens from the object side in the third lens group at the d line is NL32, Conditional Expressions (3) and (4) below are satisfied:

$$-0.02 < \theta gL31 - \theta gL32 < 0.02 \quad (3)$$

$$0.3 < NL31 - NL32 < 0.5 \quad (4).$$

17. The rear attachment lens according to claim 15, wherein Conditional Expression (2-1) below is satisfied:

$$0.6 < fG1/fL11 < 1.2 \quad (2\text{-}1).$$

18. The rear attachment lens according to claim 16, wherein Conditional Expression (3-1) below is satisfied:

$$-0.01 < \theta gL31 - \theta gL32 < 0.01 \quad (3\text{-}1).$$

19. The rear attachment lens according to claim 16, wherein Conditional Expression (4-1) below is satisfied:

$$0.35 < NL31 - NL32 < 0.45 \quad (4\text{-}1).$$

20. An imaging apparatus comprising:
the main lens; and
the rear attachment lens according to claim 14.

* * * * *